July 28, 1931. H. E. BUCKLEN 1,816,632
ELECTRIC WINDMILL
Filed Dec. 4, 1928 2 Sheets-Sheet 1
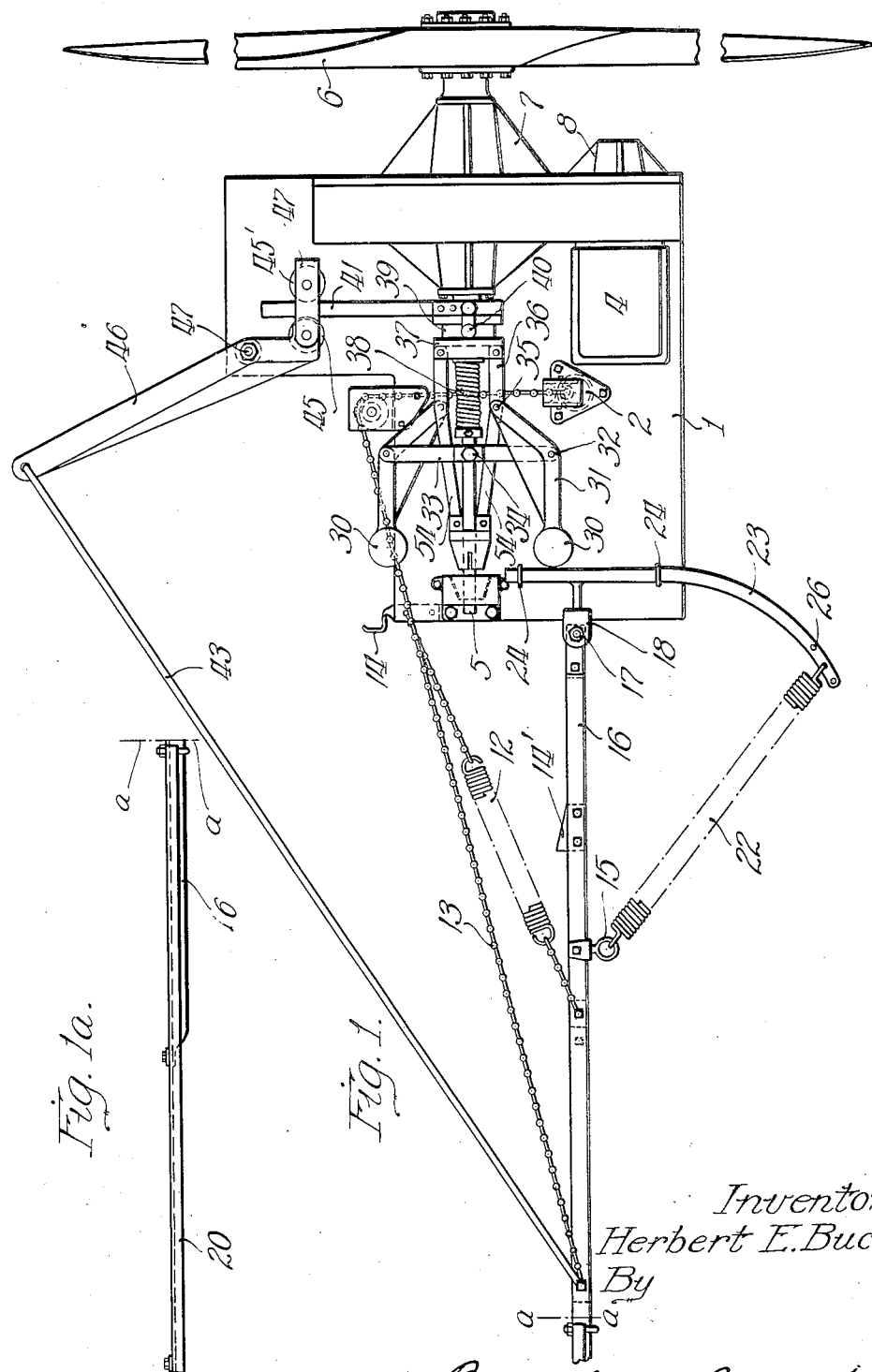
Inventor
Herbert E. Bucklen
By
Brown Jackson Boettcher & Dienner
Attys.

July 28, 1931. H. E. BUCKLEN 1,816,632
ELECTRIC WINDMILL
Filed Dec. 4, 1928  2 Sheets-Sheet 2
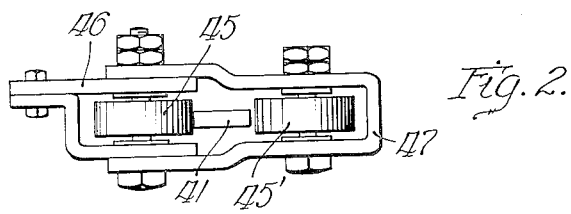
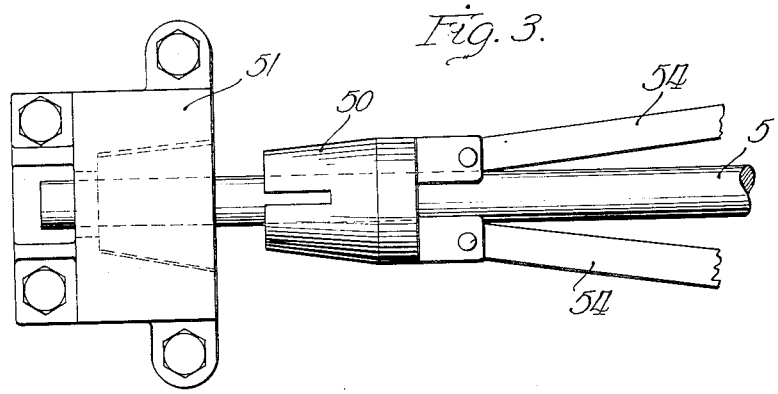
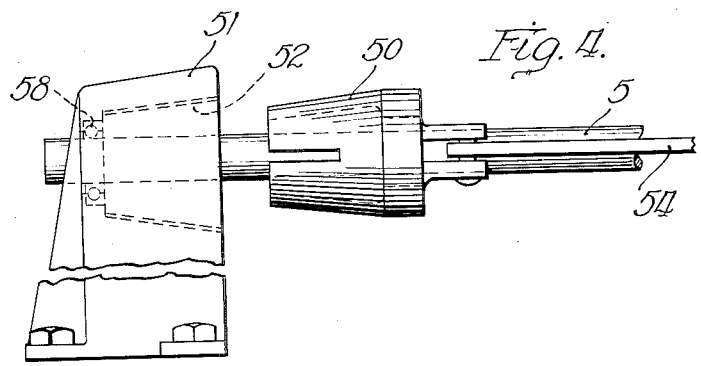
Inventor
Herbert E. Bucklen
By Brown Jackson Boettcher Dienner
Atty's.

Patented July 28, 1931

1,816,632

UNITED STATES PATENT OFFICE

HERBERT E. BUCKLEN, OF ELKHART, INDIANA, ASSIGNOR TO HERBERT E. BUCKLEN CORPORATION, A CORPORATION OF INDIANA

ELECTRIC WINDMILL

Application filed December 4, 1928. Serial No. 323,681.

My invention relates to wind driven electric power plants, such as are commonly used in isolated places where electricity must be generated locally if it is to be had at all.

A wind driven power plant generally consists of a wind driven wheel mounted on top of a supporting tower and connected to an electric generator which may be mounted adjacent to the wind wheel on top of the tower, although not always so mounted. Power plants of this kind should be so constructed that they can be started and operated by winds of low velocity, say three to six miles per hour. If this were not so, the generator would be idle for a large portion of the time. The plant must also be designed so as to be able to withstand the enormous destructive pressures that result when high winds of tornado-like velocity are encountered. While it may not be exceedingly difficult to construct a windmill that will satisfy either of those requirements alone, a good deal of difficulty is encountered in constructing a windmill that will satisfy both requirements, since the requirements are, in many ways, conflicting.

To save the windmill from destruction by high winds, it has been customary to provide a tail vane governor which is acted on by the wind and serves to turn the windmill out of the wind as the wind velocity increases. This provision, taken by itself, is satisfactory only when the change in the wind velocity is gradual. This is not always the case with tornadoes. It frequently happens, during tornadoes, that the velocity or direction of the wind changes almost instantly without any previous indication of the coming change. When this is the case, the windmill may happen to be head on in the wind and before the tail vane can swing it out of the wind the entire apparatus may be destroyed. If the windmill is made rugged enough to withstand the pressures involved under the above conditions, it is generally found to be too heavy to be started by low velocity winds.

As pointed out in the pending application, Serial No. 168,492, filed February 16, 1927, I have invented a light weight high speed screw impeller of the aeroplane type which can be started by a low wind and which offers a small area to the wind whereby it can withstand the pressures resulting from very high winds. This would seem to be a solution to the problem.

However, it has been found that certain other difficulties are encountered. Aeroplane type impellers such as are here considered can derive full benefit from winds of a very high velocity and can operate at a very high speed. Since this is the case, a tornado-like wind will not destroy the impeller but will operate it at a very high speed and if the electric generator driven thereby is of the shunt field type, as is usually the case, excessive voltages will be generated, resulting very frequently in the injury of the generator.

To overcome this difficulty protective relays have in the past been connected to the generator for the purpose of preventing the generation of excessive voltages. Delicate relays are generally objectionable where a skilled attendant is seldom, if ever, available. The introduction of protective relays introduces just one more place where a breakdown may occur and a failure of the relay may result in the destruction of the plant. To overcome the above difficulties I provide a wind driven electric generating plant of the kind driven by a two-bladed impeller such as shown in the prior application above referred to, with a generator which cannot generate destructive voltages when the wind wheel is operating at an excessively high speed.

I have discovered that certain characteristics of the third-brush generator render it very desirable for use with a wind wheel, especially a wheel having a low breakaway torque and capable of attaining a very high speed. A generator of this kind has practically zero output below a certain speed, and as the speed increases above a certain amount the output of the generator rises very rapidly until the maximum output for the particular generator is reached, beyond which a further increase in speed results in a gradual decrease in the output. Since the output is practically zero for speeds below a certain amount, the opposing torque at those speeds is, of course, very low. In a wind operated power plant utilizing a propeller of the kind here contemplated, this characteristic is of great importance in that the impeller is thereby enabled to start at a lower wind speed. An impeller having only two comparatively narrow blades offers very little surface to the wind; hence there is difficulty in getting started at low winds.

Once the propeller starts rotating, it can continue, but with a load such as is imposed by the ordinary shunt wound generator, there is an appreciable opposing torque, due to which a higher wind velocity is needed to start the wind wheel than would be necessary in the absence of the opposing torque. With a third-brush generator, such as is here used, the torque opposing the starting of the wind wheel is reduced to a minimum, and, further, as the wheel gradually accelerates there is still very little opposing torque until a certain speed is reached. It is only when the impeller has accelerated to a certain point that the generator commences to be an appreciable load upon the impeller and from that point the output very rapidly increases as the speed of the wheel increases until the greatest generator output is reached. Due to this characteristic of the generator, the impeller is permitted to reach its greatest speed very much sooner than when the ordinary shunt wound generator is used.

One of the characteristics of the third-brush generator is that the voltage decreases as the speed with which the generator is driven increases beyond a certain point. This is a feature which, under certain conditions, is quite advantageous, but, under other conditions is undesirable.

This property of the generator serves to protect the generator against destroying itself by excessive voltages generated when the wind wheel is suddenly driven at a greatly increased speed by a sudden gust of wind during a tornado. This characteristic is, however, objectionable during the ordinary running of the generator, for if the generator were operating at its maximum rated output and if the speed of the wind wheel were to be increased by a slight amount, the output of the generator would be slightly reduced, thereby reducing the opposing torque of the generator upon the wind wheel.

This slight reduction in the opposing torque would tend to cause the wind wheel to increase its speed a little more, resulting in a further decrease in the output of the generator and in the opposing torque upon the wind wheel. The wind wheel would then tend to speed up still more. This process would continue until equilibrium would be reached. This may be at a generator speed such that the output is about sixty per cent cent of the rated output. It may occasionally happen that rather high winds prevail for a number of days. Under those conditions, with the ordinary third brush generator, the output of the power plant might be materially decreased over an extended period of time.

I have provided a way of eliminating the objectionable feature resulting from the tendency of a third brush generator decreasing its output as the speed increases, and at the same time retaining the protective advantage offered by this characteristic of the generator. This is accomplished by providing a governor to swing the wind wheel out of the wind when the wheel operates above its rated speed regardless of whether the wind is above or below the velocity necessary to drive the propeller at the rated speed. The significance of this may be more clearly understood from the following consideration:

Assume that the impeller is operating at its rated speed and a sudden gust of wind increases the speed of the impeller. The generator output is thereby instantaneously decreased with the result that the opposing torque on the impeller is decreased. The impeller will thereby accelerate with the result that the generator voltage is further decreased thereby further decreasing the opposing torque of the generator on the impeller, permitting the impeller to further accelerate. The result of this may be that equilibrium will be reached with the impeller driving the generator at such a speed that the output is about 50% or 60% of the rated output. At this time even though the wind velocity may have decreased to that slightly below the amount necessary to drive it at its normal speed, the generator will nevertheless continue operating at a speed above the rated speed. The ordinary governor used in wind driven electric generating plants is responsive to wind velocity and not to the velocity of the impeller, hence, under the above conditions, if the wind velocity is approximately that necessary to ordinarily drive the impeller at the rated speed, the wind governor will not turn the impeller out of the wind; the impeller continues rotating at that high speed and the generator output remains a good deal below the rated output. By providing a governor which acts independent of the wind velocity and which is controlled solely by the speed of the impeller, in combination with a power utilizing source such as a third brush generator which may, under certain conditions, cause the impeller to operate at a speed above that at which it would normally be driven by a given wind velocity, there is provided a means for turning the impeller out of the wind even though the wind velocity is such that ordinarily the impeller would not be turned out of the wind. As the impeller is turned out of the wind, its velocity decreases thereby increasing the opposing torque of the generator. This continues until a point is reached where the impeller cannot quite carry the load due to the fact that it has been turned out of the wind. The impeller will now rapidly decelerate until the load on the impeller commences to decrease. This means that we have now passed the point of maximum output of the generator. The governor then gradually turns the impeller back into the wind with the result that it again commences to accelerate until it drives the generator at its rated speed at which time the impeller will be headed straight into the wind, if during this transitory period the wind velocity remains the same. If, however, the wind velocity has increased, then the impeller will reach its rated speed before the governor has turned it fully in the wind, and at that point the governor will cease to further turn the impeller into the wind.

As pointed out in my pending application, Serial No. 307,112, filed September 20, 1928, now patent No. 1,746,991, if a tail vane wind controlled governor is used in connection with a third brush generator, it is necessary that the governor be maintained exceedingly accurate or an impeller, such as a flexible tipped impeller having inherent speed regulating characteristics must be used. If, however, we use a governor such as is controlled by the velocity of the propeller rather than by velocity of the wind, the necessity of using a propeller which is inherently regulated for a certain speed is obviated.

Tail vane wind controlled governors have reached a high stage of perfection and it is therefore proposed to retain the tail vane governor and overcome the objectionable features that arise from the use of such a governor in connection with a third brush generator by providing an auxiliary governor controlled by the speed of the impeller to turn the impeller out of the wind when the tail vane governor ordinarily would not turn it.

In order to acquaint those skilled in the art with the manner of constructing and operating my invention, I shall describe in the following specification in connection with the accompanying drawings a preferred embodiment of my invention.

In the drawings:

Fig. 1 is a schematic layout of a wind electric power plant embodying my invention.

Fig. 1a shows the portion of the structure to the left of the line a—a of Fig. 1.

Fig. 2 is a fragmentary view showing a portion of the mechanism that transmits the actuating force from the centrifugal governor to the tail vane.

Figs. 3 and 4 are enlarged top and side views, respectively, of the friction brake.

Referring now more particularly to the drawings, 1 designates a turn table pivoted at the top of a supporting tower through a bearing 2 on a vertical shaft. The third brush generator 4 is mounted on the turn table 1 and has its axis spaced from the axis provided by the bearing 2 and its vertical shaft. The shaft 5 which is driven by the impeller 6 is mounted on the turn table 1 in suitable bearings and is offset from the axis of the vertical shaft 2. The shaft 5 is located on the opposite side of the shaft 2 from the generator 4, and is coupled to the generator 4 by means of suitable gearing enclosed in the casings 7 and 8. By means of the gearing the generator speed is stepped up to about six times the speed of the impeller. A movable tail vane is provided and consists of a rearwardly extending frame 16 having a pivotal connection through a vertical pin 17 and bracket 18 to the rear of the turn table 1 adjacent the bearing 2 thereof. A wind vane 20 is carried at the other end of the frame 16.

The angle tension spring 22 is connected at one end to an adjustable angle tension arm 23 which extends outwardly from one end of the turn table 1 and is suitably secured thereto by U-bolts 24. The other end of the spring 22 is connected to the tail vane frame through an adjustable eye-bolt 15. The usual cushioning spring 12, pull in chain 13 and bumper plates 14—14' are provided.

It is to be noted that while the impeller 6 is offset from the shaft 2 supporting the turn table 1, the generator 4 is offset in the opposite direction thereby tending to produce a balanced condition. An increase in the wind pressure against the impeller 6 increases the speed of rotation thereof, and, due to the fact that it is offset from the fulcrum of the turn table, it tends to force the impeller out of the wind and, simultaneously, through the medium of the spring 22 tends to swing the tail vane into the wind. This causes increased wind pressure on the wind side of the tail vane, thereby tending to force the tail vane out of the wind against the action of the spring 22. The tension of the spring 22 may be adjusted at the bolt 15 and it may be adjusted at the angle tension arm 23 by inserting the end of the spring in any one of the holes 26 provided in the angle tension arm.

With a given generator and a given wind wheel, it takes a certain wind velocity to operate the generator at its maximum output. The tension on the springs 12 and 22 is adjusted to such a value that the wind wheel is maintained in the wind until the required wind velocity is reached. If the wind velocity increases, the turning moment tending to turn the table 1 about its axis 2 exceeds the opposing moment of the spring 22, and the turn table 1 commences to turn out of the wind. As it turns out of the wind, the tension on the spring 22 increases. The construction is such that the angle through which the table 1 is turned at any given wind velocity is the amount just necessary to maintain the speed of the impeller at its rated speed. Thus, the maximum generator output is maintained even though the wind velocity is such that the wind wheel would, ordinarily, be driven at a speed above the rated speed. Upon a sudden change in the direction or velocity of the wind, the speed of rotation of the wind wheel may be greatly increased. This will cause a decrease in the output of the generator. A short interval of time later the tail vane governor will have turned the wind wheel out of the wind into a position such that the generator would be driven at its rated speed had its speed previously not been increased. Since the speed of the generator has been increased, the opposing torque of the generator upon the impeller has been decreased with the result that although the wheel is at a proper angle to the wind to operate at its rated speed, it operates above its rated speed.

In addition to the above it is to be noted that with prolonged usage, the spring 22 stretches and becomes weaker. The spring must then be reset so that the governor maintains the impeller in the wind until the rated maximum generator output is reached and, further, so that the wind wheel is turned out of the wheel by such an amount that the rated maximum generator output is maintained. As pointed out above, it is very essential that the adjustment of the spring 22 should be maintained accurate, for if the spring permits the impeller to be headed into the wind when the wind velocity is even slightly in excess of that necessary to drive the impeller at its rated speed, the impeller will accelerate appreciably, due to the decreasing opposing torque of the generator. To overcome the possibility of the impeller being operated above its rated speed for appreciable periods of time, due to a temporary acceleration brought about by high winds, or due to a slight stretching of the spring 22, there is provided, in addition to the tail vane governor, a speed controlled governor controlled by the speed of the impeller to assist the tail van governor in turning the impeller into and out of the wind. The tension of the spring 22 is adjusted to such a value that the tail vane, cooperating with the speed governor, to be presently more fully described, maintains the impeller in the wind at wind speeds below that necessary to drive the generator at its rated speed.

The fly ball governor consists of two weighted balls 30 at the end of the crank lever 31 pivoted at 32 to the cross rod 33 which is keyed to the shaft 5 and rotatable therewith. The other ends of the crank arms 31 are pivoted at 35 to the links 36 which in turn are connected to the collar 37 on the shaft 5. The collar 37 is splined to the shaft to turn therewith and is movable longitudinally of the shaft. The collar is maintained in the position shown in Fig. 1 of the drawings by the spring 38. Upon the outward movement of the balls 30 the crank arms 31 move the collar 37 towards the left, as seen in Fig. 1, against the action of the spring 38. The collar 37 is provided with a groove 39 within which the pins 40 ride. The pins 40 are carried by the lever 41 which is movable longitudinally of the rotatable shaft 5. The lever 41 rides between two rollers 45 and 45' which are mounted in a U-shaped bracket 47 (Fig. 2) carried by the bell crank lever 46 and upon movement of the lever 41 to the left, as seen in the drawings, the bell crank lever 46 rotates in a clockwise direction about its pivot 47. Clockwise rotation of the bell crank lever 46 draws the tail vane governor and the turn table 1 towards one another. This results in the swinging of the propeller 6 out of the wind by an amount which is a function of the velocity of the propeller 6.

The centrifugal governor, in moving the lever 41 to the left also moves the brake or clutch element 50 into engagement with the stationary brake element 51, thus applying a brake to the impeller shaft to further slow down the impeller.

A rod 43, rather than a chain or rope, connects the lever 46 with the tail vane. If the impeller is turned out of the wind by means of the pull in chain 13, then as the turn table 1 and the tail vane swing towards each other the rod 43 causes the bell crank lever 46 to turn about its pivot 47 in a clockwise direction, as seen in Fig. 1. The roller 45' moves the lever 41 to the left, thus applying the brake to the impeller shaft in the same manner as though the turn table had been turned out of the wind by the centrifugal governor.

The clutch or brake illustrated consists merely of a stationary socket member 51 which carries a cone member 52, to be engaged by the split cone member 50 that is moved along the impeller shaft 5 by the thrust arms 54. A bearing 58 carried by the member 51 supports the end of the impeller shaft.

As the fly balls 30 are forced outward when the impeller speeds up, the impeller is turned out of the wind until the brake elements 50 and 51 engage. For this purpose the member 51 is preferably adjustably mounted as to its position on the turn table 1. The engagement of the brake elements will cause a retardation of the impeller, preventing the spinning of the impeller and tending to quickly bring the speed down to such a value that the load of the third brush generator will be sufficient to hold the impeller down to its rated speed.

By providing the fly ball governor in connection with the tail vane governor the necessity of an exceedingly accurate adjustment of the spring 22, when the apparatus is used with a third brush generator, is overcome. Under these conditions if the spring 22 is slightly out of adjustment so that the tail vane does not tend to turn the impeller out of the wind until a wind velocity in excess of that necessary to drive the generator at the rated speed is reached, there will still not be any appreciable racing of the impeller, for upon a slight increase in speed of the impeller the centrifugal governor will act to turn the impeller out of the wind.

In compliance with the requirements of the patent statutes, I have herein described a preferred embodiment of my invention. It is, however, to be understood that my invention is not limited to the precise construction shown, the same being merely illustrative.

What I consider new and desire to secure by Letters Patent is:

1. A wind driven power plant comprising means for absorbing power from the wind, power translating means driven thereby, the opposing torque of the power translating means increasing with increasing speed up to its rated speed and decreasing upon an increase in speed beyond its rated speed, whereby there is a tendency to accelerate once the rated speed is exceeded, and governing means controlled by the wind pressure and the speed of operation of the power absorbing means for controlling the position of the power absorbing means in the wind stream to prevent such acceleration.

2. A wind driven power plant comprising the combination with a high speed low torque wind operated impeller, power translating means for absorbing the power of the impeller, said means having a decreasing torque as the speed exceeds the rated speed, and means under the combined control of the wind pressure and of the impeller velocity when either exceeds the rated velocity for turning the impeller at an angle to the wind stream to decrease the impeller velocity.

3. A wind driven power generating plant comprising the combination of a wind wheel capable of operating at speeds in excess of the rated speed, means for absorbing the power of the wind wheel, said means having a decreasing torque as the speed exceeds the rated speed, and speed controlled means independent of the wind velocity and effective when the wheel tends to operate at a speed in excess of the rated speed for turning the wheel at an angle to the wind so as to reduce the speed of the wind wheel.

4. A wind driven power plant comprising a wind driven impeller, means driven by the impeller, a governor driven by the impeller, a tail vane governor controlled jointly by the wind and by the first mentioned governor for turning the impeller out of the wind, and a brake controlled by the first named governor and independent of the tail vane governor for impeding the speed of the impeller.

5. A wind electric power plant comprising the combination with an electric generator which when driven above its rated speed tends to race, a wind impeller driving the generator, a wind controlled governor for turning the impeller at an angle to the wind such as to reduce the effect of high winds to that necessary to drive the generator at its rated speed, and a speed controlled governor for further turning the impeller out of the wind when the generator tends to race.

6. A wind driven electric power plant comprising a low torque high speed impeller, a generator coupled thereto, said generator having a drooping voltage characteristic for increasing speeds beyond the rated speed, whereby the generator is protected against excessive voltages due to sudden gusts of wind, and a governor controlled by the speed of rotation of the impeller for turning the impeller out of the wind when the impeller velocity exceeds that necessary to drive the generator at its rated speed, whereby the generator is maintained at its rated output during prolonged high wind periods.

7. A wind driven electric power plant comprising a low torque high speed impeller, a generator coupled thereto, said generator having a drooping voltage characteristic for increasing speeds beyond the rated speed, whereby the generator is protected against excessive voltages due to sudden gusts of wind, a governor controlled by the pressure of the wind for turning the impeller out of the wind when the wind velocity exceeds that necessary to drive the generator at its rated speed, and a governor controlled by the speed of rotation of the impeller for turning the impeller out of the wind when the impeller speed exceeds the rated speed, thereby opposing the tendency of the plant to increase in speed due to the decreasing opposing torque of the generator once the speed of the generator passes beyond its rated speed.

In witness whereof, I hereunto subscribe my name this 23rd day of November, 1928.

HERBERT E. BUCKLEN.